Nov. 22, 1966 B. R. SHILTON 3,286,799

DISC BRAKE FOR A VEHICLE

Filed Sept. 28, 1964

Inventor
Brian Roger Shilton

By Cushman, Darby & Cushman
Attorneys

United States Patent Office 3,286,799
Patented Nov. 22, 1966

3,286,799
DISC BRAKE FOR A VEHICLE
Brian Roger Shilton, Middlewich, England, assignor to Rolls-Royce Limited, Derby, England, a company of Great Britain
Filed Sept. 28, 1964, Ser. No. 399,671
Claims priority, application Great Britain, Oct. 25, 1963, 42,296/63
3 Claims. (Cl. 188—218)

This invention concerns a disc brake for a vehicle.

Disc brakes have a tendency to squeal in operation and this is believed to be due to the fact that the disc is excited, by the friction pads on opposite sides thereof, at a natural frequency of axial vibration in which there are a number of radial nodes and anti-nodes.

According therefore to the present invention there is provided a disc brake for a vehicle whose disc is provided with a groove in which is retained damping material which is of such a nature and is so arranged in the groove that it damps the natural frequency of axial vibration of the disc.

In the disc brake of the present invention axial vibration excited on the outside of the disc is transmitted through the disc to the wall of the said groove where it is damped by coming into frictional contact with the said damping material.

The said groove is preferably provided adjacent the periphery of the disc since the amplitude of the wave defined by the said nodes and anti-nodes is at its maximum at the said periphery.

The damping material should be sufficiently soft to ensure maximum contact with the disc and yet should not melt when the disc becomes hot. The degree of damping effected by the damping material has been found, moreover, to be affected by the mass of the damping material and also by the extent to which the damping material has some slight degree of freedom of movement.

The damping material preferably comprises metal wire which may be ordinary mild steel wire but which is preferably copper wire.

The wire is preferably of circular cross section and is preferably in the form of a number of different strands thereof which in operation rub against each other to provide damping.

The invention also comprises a vehicle provided with at least one disc brake at set forth above.

The invention is illustrated, merely by way of example, in the accompanying drawings, in which.

Figure 1:
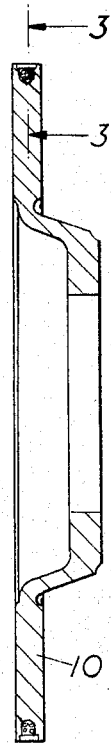
FIGURE 1 is a sectional elevation of part of a disc brake according to the present invention.
Figure 2:
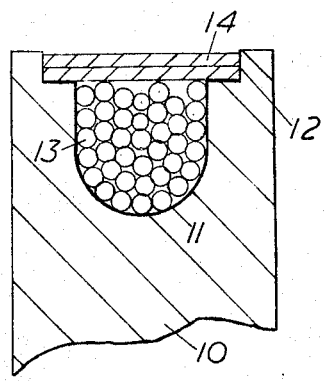
FIGURE 2 is an enlarged broken away sectional view of part of the structure shown in FIGURE 1.
Figure 3:
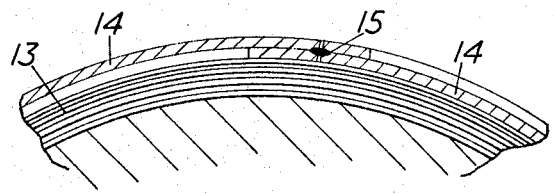
FIGURE 3 is a broken away section taken on the line 3—3 of FIGURE 1.

Referring to the drawings, a disc brake for a vehicle comprises a disc 10 against which operates, on opposite sides thereof, friction pads (not shown).

The disc 10 is formed adjacent its periphery with an annular groove 11, an annular groove 12 which communicates with the groove 11 being formed at the periphery itself.

The groove 11 is packed with copper or other metal wire 13. The wire 13 may either be constituted by a large number of turns of a single strand of wire or may be constituted by a single turn of a multi-strand wire. As will be seen, the wire is of circular cross section.

The wire 13 is such and is given a degree of freedom of movement such that it damps the natural frequency of axial vibration of the disc which arises from the action of the friction pads thereof.

The wire 13 is retained in the groove 11 by a metal band 14 which is located in the groove 12. The band 14 has overlapping ends which are spot-welded to each other at 15.

Alternatively, the band 14 may have its ends butted together or it may be formed from an endless loop of metal which is sprung or shrunk onto the disc 10.

I claim:

1. A vehicle disc brake comprising a disc having a peripheral groove therein, a plurality of strands of wire which are disposed loosely in the groove and which damp the natural frequency of axial vibration of the disc and a band extending about the periphery of said disc and covering said groove for retaining said strands of wire loosely in said groove.

2. A disc brake as claimed in claim 1 in which each of said strands of wire is of circular cross-section.

3. A disc brake as claimed in claim 1 in which said band has overlapping ends secured to each other.

References Cited by the Examiner

UNITED STATES PATENTS

| 2,764,260 | 9/1956 | Fleischman | 188—1 |
| 3,033,318 | 5/1962 | Jewell | 188—1 |

FOREIGN PATENTS

| 934,096 | 8/1963 | Great Britain. |

DUANE A. REGER, *Primary Examiner.*